(12) United States Patent
Gundlach et al.

(10) Patent No.: US 12,306,644 B2
(45) Date of Patent: May 20, 2025

(54) HYBRID FLOW RATIO CONTROLLER SYSTEM WITH CHANNELS FOR FLOW RATIO CONTROL, FLOW RATE OR PRESSURE CONTROL, AND OVERFLOW CONTROL

(71) Applicant: HORIBA STEC, Co., Ltd., Kyoto (JP)

(72) Inventors: Maximilian Martin Gundlach, Reno, NV (US); Patrick Lowery, Reno, NV (US); Tadahiro Yasuda, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 503 days.

(21) Appl. No.: 17/930,893

(22) Filed: Sep. 9, 2022

(65) Prior Publication Data

US 2024/0085930 A1    Mar. 14, 2024

(51) Int. Cl.
| | |
|---|---|
| G05D 11/13 | (2006.01) |
| B05C 5/02 | (2006.01) |
| G01F 1/42 | (2006.01) |
| G01F 15/00 | (2006.01) |

(52) U.S. Cl.
CPC .......... *G05D 11/132* (2013.01); *B05C 5/0225* (2013.01); *G01F 1/42* (2013.01); *G01F 15/005* (2013.01)

(58) Field of Classification Search
CPC ........ G05D 11/132; B05C 5/0225; G01F 1/42
See application file for complete search history.

(56) References Cited

U.S. PATENT DOCUMENTS

| | | | |
|---|---|---|---|
| 10,996,689 B2 | 5/2021 | Yasuda et al. | |
| 11,187,561 B2 | 11/2021 | Ding | |
| 2015/0005955 A1* | 1/2015 | Gregor | G05D 7/0664 700/282 |
| 2021/0404064 A1* | 12/2021 | Dip | C23C 16/4584 |
| 2022/0129021 A1* | 4/2022 | Okada | G05D 11/132 |

* cited by examiner

*Primary Examiner* — Mark A Connolly
(74) *Attorney, Agent, or Firm* — Alleman Hall & Tuttle LLP (57) ABSTRACT

A hybrid flow ratio controller system is provided, which includes an inlet configured to receive a total inlet fluid flow and three or more distribution channels. Each of the three or more distribution channels has a respective variable flow control valve and carries a respective portion of the total inlet fluid flow. The hybrid flow ratio controller further includes a controller operatively coupled to the respective variable flow control valves. The controller is configured to control a flow rate of at least a first distribution channel according to a predetermined flow ratio of the inlet fluid flow in accordance with a flow ratio control mode, to control a flow of at least a second distribution channel in either a flow rate control mode or a pressure control mode, and to control a third distribution channel in an overflow mode.

20 Claims, 8 Drawing Sheets

HYBRID FLOW RATIO CONTROLLER SYSTEM WITH CHANNELS FOR FLOW RATIO CONTROL, FLOW RATE OR PRESSURE CONTROL, AND OVERFLOW CONTROL

BACKGROUND

In a type of fluid distribution system referred to as a flow ratio controller, flow received at a single inlet is divided into multiple channel outlet flows according to channel-specific flow ratio setpoints that specify a ratio of the flow in each channel to the total measured inlet flow. The ratio setpoints are typically expressed as a percentage of the total inlet flow, and total 100%. There is typically no limit to the number of channels (N) that the conventional system will allow as long as there is both a) sufficient inlet flow to divide between N number of channels and b) the ratio setpoint percentages for each channel result in individual channel flows that are above the lowest detectable signal, or noise level, such that the ratio control algorithm has sufficient signal to be stable.

In a conventional flow ratio controller, it is difficult to provide fluid flows repeatably and reproducibly, especially in applications utilizing relatively very low flows targeted at individual showerhead zones in a process chamber. Errors occurring in flow control upstream of the flow ratio controller can cause the flow rate and pressure at the single inlet of the flow ratio controller to vary, which can cause errors in the flow ratio control of the multiple channel outlet flows. Such errors may adversely affect applications requiring high precision and low error rates, such as semiconductor manufacturing.

SUMMARY

To address these issues, according to one aspect of the present disclosure, a hybrid flow ratio controller system is provided. The hybrid flow ratio controller includes an inlet configured to receive a total inlet fluid flow and three or more distribution channels fluidically connected to the inlet and arranged in parallel in a branching flow path downstream of the inlet. Each of the three or more distribution channels is provided with a respective variable flow control valve and being configured to carry a respective portion of the total inlet fluid flow. The hybrid flow ratio controller further includes a controller operatively coupled to the respective variable flow control valves of each of the three or more distribution channels to control the respective variable flow control valves in a feedback loop. The controller is configured to control a flow rate of at least a first distribution channel of the three or more distribution channels according to a predetermined flow ratio of the inlet fluid flow in accordance with a flow ratio control mode. The controller is further configured to control a flow of at least a second distribution channel of the three or more distribution channels in either a flow rate control mode or a pressure control mode. The controller is also configured to control a third distribution channel of the three or more distribution channels in an overflow mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
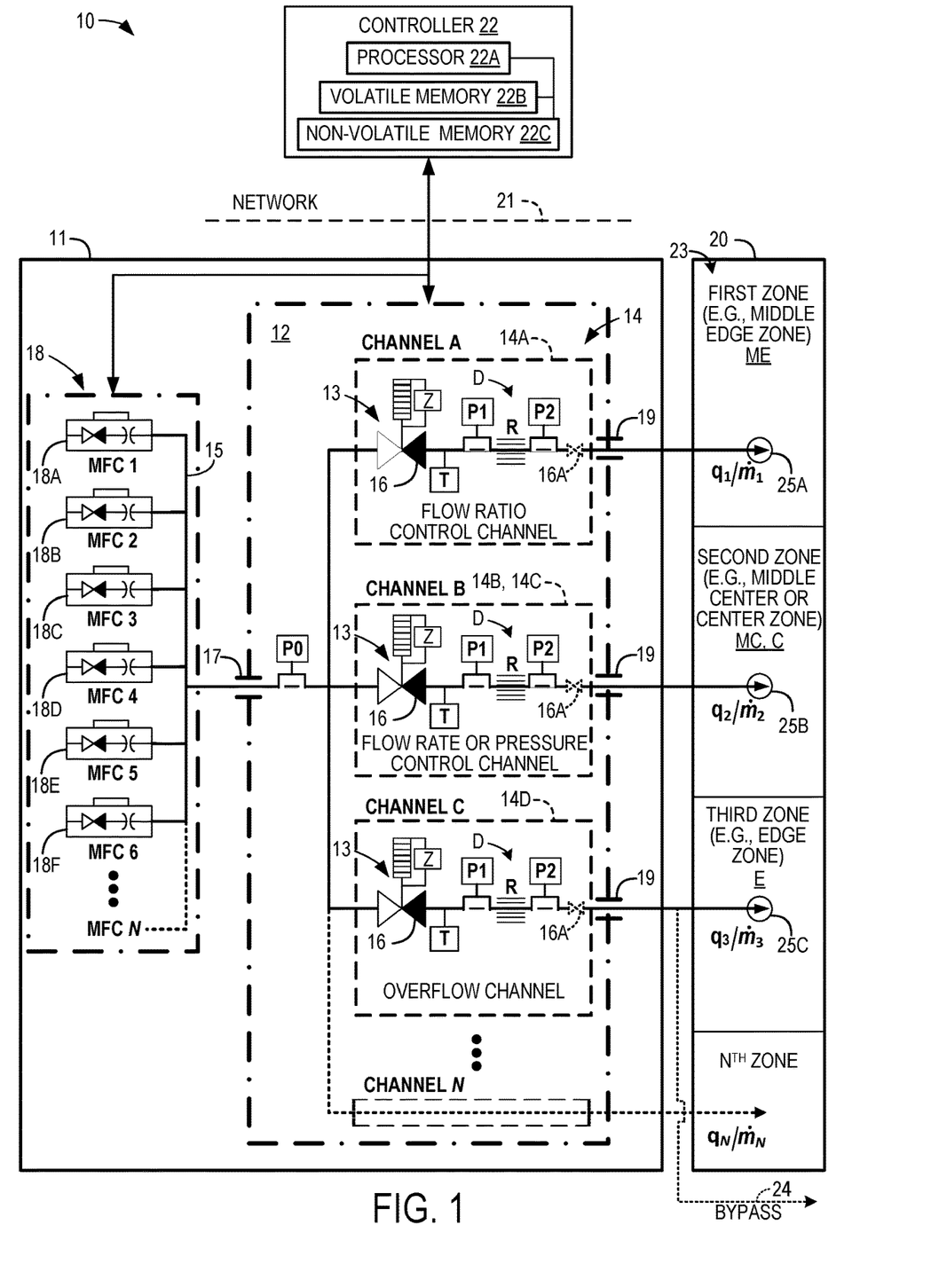
FIG. 1 is a schematic view of a hybrid flow ratio controller system according to a first example configuration of the present disclosure.

In view of the above issues, referring to FIG. 1, a hybrid flow ratio controller system 10 is provided, shown in a first example configuration. The hybrid flow ratio controller system 10 includes one or more mass flow controllers 18. The one or more mass flow controllers 18 are configured with outlets that flow fluid into a manifold 15 that collects the flow from each of the mass flow controllers 18 and delivers it to an inlet 17 of a flow splitter subsystem 12 of the hybrid flow ratio controller system 10. The inlet 17 is configured to receive a total inlet fluid flow from the one or more mass flow controllers 18. The flow splitter subsystem 12 of the hybrid flow ratio controller system 10 is further configured with three or more distribution channels 14. The distribution channels 14 are fluidically connected to the inlet 17 and arranged in parallel in a branching flow path downstream of the inlet 17, leading to respective outlets 19. Each of the three or more distribution channels 14 is provided with a respective variable flow control valve 16 and is configured to carry a respective portion of the total inlet fluid flow. The variable flow control valve may be contained within a channel-specific mass or volumetric flow controller 13 positioned on each distribution channel.

The hybrid flow ratio controller system 10 further includes a controller 22 operatively coupled to the respective variable flow control valves 16 of each of the three or more distribution channels 14 to control the respective variable flow control valves 16 in a feedback loop. The variable flow control valves may be proportional flow control valves, for example. In some example configurations, the controller 22 also may be configured to control the one or more mass flow controllers 18, for example, to command each mass flow controller 22 to generate a requested amount of fluid flow. However, the expected flow from the mass flow controllers 18 occasionally varies from the target amount, producing an error in the total inlet fluid flow at inlet 17. The flow splitter subsystem 12 is configured to accommodate errors in the total inlet flow and ensure that the error in the flow is guided to appropriate distribution channels among the three or more distribution channels 14, so other predetermined distribution channels may be enabled to have substantially error free flows even in the presence of such upstream flow variation.

The hybrid flow ratio controller system 10 may be configured as a gas delivery apparatus which may be enclosed within a housing 11. The fluid lines described herein may be implemented using flow blocks, piping, or other flow passage construction. It will be appreciated that, while six mass flow controllers 18A-F are depicted in FIG. 1, their number is not particularly limited, and may be fewer or greater than six, as indicated by the notation MFC N.

The controller 22 includes a processor 22A, volatile memory 22B such as Random Access Memory (RAM), and non-volatile memory 22C such as Read Only Memory (ROM), FLASH memory, hard drive, etc. Non-volatile memory 22C stores program instructions that when executed by the processor 22A using portions of volatile memory 22B, cause the processor 22A to instruct the flow splitter subsystem accordingly to achieve the implement the control processes described herein. In some implementations, the controller 22 may be configured as a System on Module (SOM). The processor 22A may be a central processing unit (CPU), application-specific integrated circuit (ASIC), field-programmable gate array (FPGA), or other type of microprocessor, and may be a multi-core processor, for example. The controller 22 may be operatively coupled to the flow splitter subsystem 12 via a network 21 or direct data connection. In some embodiments, it will be appreciated that a channel-specific control microprocessor can be included within each distribution channel, including memory and processor functionality used to control the flow controller positioned on that channel. It will be appreciated that the microprocessor for one of the channels can be programmed to implement the functions of controller 22. When such a configuration is employed, the channel having the microprocessor configured to act as the controller 22 is referred to as a master channel.

As will be described in further detail in FIG. 2, the controller 22 is configured to control a flow rate of at least a first distribution channel of the three or more distribution channels 14 according to a predetermined flow ratio of the inlet fluid flow in accordance with a flow ratio control mode. Distribution channels controlled in the flow ratio control mode may be referred to as flow ratio control channels 14A. The controller 22 is further configured to control a flow of at least a second distribution channel of the three or more distribution channels in either a flow rate control mode or a pressure control mode. The pressure control mode may be either a first pressure control mode based on signals from an upstream pressure sensor P1 of a differential pressure sensor D or a second pressure control mode based on signals from a downstream pressure sensor P2 of the differential pressure sensor D, as discussed below. The second distribution channel may be referred to as a flow rate control channel 14B or a pressure control channel 14C, depending on its configuration. In one configuration, the second distribution channel is controlled in the flow rate control mode. In another configuration, the second distribution channel is controlled in the pressure control mode.

The controller 22 is configured to control a third distribution channel of the three or more distribution channels 14 in an overflow mode. Configured in this manner, the third distribution channel may be referred to as an overflow channel 14D. In some embodiments, a fourth distribution channel is provided, and both flow rate control channel 14B and a pressure control channel 14C are provided, as discussed below in relation to FIG. 4.

A main pressure sensor P0 is optionally provided upstream of the plurality of distribution channels 14, typically before the branch point in the branching flow path, and in the vicinity of inlet 17. Pressure data from the main pressure sensor P0 is sent to the controller 22, and may be used in the control of the pressure and flow rate through the plurality of channels.

Each distribution channel 14 includes a respective control valve 16 with a valve position sensor Z configured to measure an opening degree of the valve, a temperature sensor T configured to measure the temperature of fluid in the distribution channel 14, a fixed geometry flow restrictor R configured to restrict flow of the fluid, an upstream pressure sensor P1 configured to measure a pressure of the fluid upstream of the restrictor R, and a downstream pressure sensor P2 configured to measure a pressure of the fluid downstream of the restrictor R, arranged in this order in a downstream direction of the flow path along each distribution channel 14. The valves 16 are typically upstream of the flow restrictor R, but may be downstream of the flow restrictor R as shown in dashed lines at 16A. Each distribution channel 14 is configured with a respective outlet 19 of the flow splitter subsystem 12. The fluid flow outputted from the outlet 19 of each distribution channel 14 has a volumetric flow rate represented by the notation $q_1$-$q_N$, and a mass flow rate represented by the notation $\dot{m}_1$-$\dot{m}_N$. The controller 22 may be configured to control either parameter of the fluid flow in each distribution channel 14. The upstream pressure sensors P1, downstream pressure sensors P2, and the main pressure sensor P0 may be configured as diaphragm-isolated pressure sensors.

Each of the three or more distribution channels 22 is provided with a differential pressure sensor D including an upstream pressure sensor P1 and a downstream pressure sensor P2 positioned upstream and downstream of a flow restrictor R, respectively, and configured to send pressure sensor data to the controller 22. Pressure sensor data from upstream pressure sensor P1 and downstream pressure sensor P2 is sent to the controller 22 to implement the flow rate control mode, the flow ratio control mode, the pressure control mode (including the first and second pressure control modes), and the overflow control mode. Specifically, the pressure sensor data is sent to the controller 22 for calculating a mass flow rate at the differential pressure sensor D. The calculated mass flow rates for each channel may be used by the controller 22 to calculate mass flow ratios among the different channels.

In the configuration depicted in FIG. 1, the hybrid flow ratio controller system 10 includes a showerhead 20 provided downstream of the three or more distribution channels 14. The showerhead 20 may open to a process chamber (see PC in FIGS. 2-6), in which processes such as deposition and etching are performed during semiconductor manufacturing. The showerhead includes a plurality of zones 23. The first distribution channel (i.e., flow ratio control channel 14A) and second distribution channel (i.e., flow rate control channel or 14B or pressure control channel 14C) are each fluidically connected to respective first and second outlets 25A, 25B in a respective one of the plurality of zones 23. The third distribution channel (i.e., overflow channel 14D) is fluidically connected to a third outlet 25C positioned in a zone designated to receive the overflow. Alternatively, as shown in dashed lines, the third distribution channel may be fluidically connected to a process chamber bypass line 24 that bypasses the process chamber (see PC in FIGS. 2-6). In the depicted configuration in FIG. 1, the first distribution channel (i.e., flow ratio control channel 14A) is fluidically connected to the first outlet 25A positioned in a middle edge zone of the showerhead, the second distribution channel (i.e., flow rate control channel or 14B or pressure control channel 14C) is fluidically connected to the second outlet 25B positioned in a middle center or center zone of the showerhead, and the third distribution channel (i.e., overflow channel 14D) is fluidically connected to the third outlet 25C positioned in an edge zone of the showerhead. Channel N as well as an $N^{th}$ zone 23 in showerhead 20 are depicted to illustrate that the number of channels 14 and showerhead zones 23 is not limited, and embodiments with four, five, or more channels and showerhead zones are contemplated.

As discussed above, the controller 22 is configured to selectably control the distribution channels 14 in a variety of control modes. The controller 22 may be configured to implement the flow ratio control mode for each flow ratio control channel 14A by receiving a target ratio of the inlet fluid flow at the inlet 17 for the respective flow ratio control channel 14A and controlling a respective variable flow rate valve 16 for the respective flow ratio control channel 14A to cause an estimated ratio of the channel flow to the total inlet fluid flow to trend toward the target ratio. Each flow ratio control channel 14A has an associated ratio setpoint that is set by an operator or a program on controller 22, typically expressed as a percentage, such as 1%, 5%, 30% etc., of the actual total inlet flow. The ratio may be programmed to be constant, or vary over time, for example, according to a positive or negative ramp function.

Further, the controller 22 may be configured to implement the flow rate control mode for a flow rate control channel 14B by calculating a flow rate for that flow rate control channel 14B based on the pressure sensor data for that flow rate control channel 14B and controlling a respective variable flow rate valve 16 for that flow rate control channel 14B to cause the calculated flow rate to trend toward a target flow rate in that flow rate control channel 14B. The target flow rate may be a flow rate setpoint for the flow rate control channel 14B. Each flow rate control channel 14B has an associated flow rate setpoint that is set by an operator or a program on controller 22, typically expressed as in sccm, such as 1 sccm, 5 sccm, 20 sccm, etc. The target flow rate indicated by the setpoint may be a volumetric flow rate or a mass flow rate. The flow rate may be programmed to be constant, or vary over time, for example, according to a positive or negative ramp function. The flow rate control mode does not operate to cause an estimated ratio of the channel flow to the total inlet fluid flow to trend toward a target ratio.

In addition, the pressure control mode may be either a first pressure control mode (P1 pressure control mode) based on signals from upstream pressure sensor P1 or a second pressure control mode (P2 pressure control mode) based on signals from downstream pressure sensor P2. Thus, the controller 22 is configured to implement the first pressure control mode for a respective pressure control channel 14C by receiving a target pressure for that channel and controlling a respective variable flow rate valve 16 for that pressure control channel 14C to cause an actual pressure measured by the upstream pressure sensor P1 of the differential pressure sensor D of the pressure control channel 14C to trend toward the target pressure. By using the first pressure control mode, particularly at low flow rates, the variable flow rate valve 16 is desirably unaffected by fluctuations in pressure in the vicinity of the downstream pressure sensor P2, and thus a steady flow rate can be delivered even when the pressure fluctuates downstream of the restrictor R. In other words, the first pressure control mode is desirable to be performed in situations where the behavior of valve 16 should be made less sensitive to such fluctuations. The controller 22 is configured to implement the second pressure control mode for a respective pressure control channel 14C by receiving a target pressure for that pressure control channel 14C and controlling a respective variable flow rate valve 16 for that pressure control channel 14C to cause an actual pressure measured by the downstream pressure sensor P2 of the differential pressure sensor D of the pressure control channel 14C to trend toward the target pressure. By using the second pressure control mode, a constant differential pressure between the outlet of the pressure control channel 14C and the process chamber PC can be maintained. This will result in a constant velocity of the flow delivered to the downstream process chamber PC, which can be advantageous in some applications. Each pressure control channel 14C has an associated pressure setpoint that is set by an operator or a program on controller 22, typically expressed as in Torr, such as 10 Torr, 50 Torr, etc. The pressure setpoint may be programmed to be constant, or vary over time, for example, according to a positive or negative ramp function.

Further, in the overflow mode for an overflow channel 14D, the controller 22 is configured to calculate an overflow amount as equal to the total inlet fluid flow minus a sum of fluid flow in a remainder of the three or more distribution channels 14 apart from the overflow channel 14D, which is the third distribution channel labeled Channel C in the configuration of FIG. 1, and compute a position for the valve of the overflow channel 14D to allow the overflow amount to flow through the overflow channel 14D. In this way, when an actual total inlet fluid flow differs from an expected total inlet fluid flow by an error amount, at least a portion of the error amount in the actual total inlet flow is carried by the overflow channel 14D. Another portion of the error amount, it will be appreciated, flows to the flow ratio control channel 14A, when present. No substantial portion of the error amount is carried to the flow rate control channel 14B and/or pressure control channel 14C. The overflow flow channel is initially controlled to reduce the error amount and then fixed at a predetermined valve opening. Using a predetermined valve opening instead of normal flow ratio control avoids valve hunting, which is undesirable rapid and erratic valve motion produced as the control algorithm searches for an appropriate valve position. This can be avoided or inhibited by employing a predetermined valve opening after a period of time in the overflow channel 14C.

In addition to the modes described above, in some configurations, the controller 22 may be configured to implement a position control mode in which the valve position of the valve 16 is commanded to be in a fixed position even in the presence of varying pressure and flow. The controller 22 may confirm the valve has been adjusted to the commanded position by receiving the actual valve position from valve position sensor Z. Other control modes are also envisioned. The controller 22 may implement the control modes described above using proportional/integral/derivative (PID) control algorithms. When appropriate, a slow acting PID or fast acting PID algorithm may be used.

Figure 2:
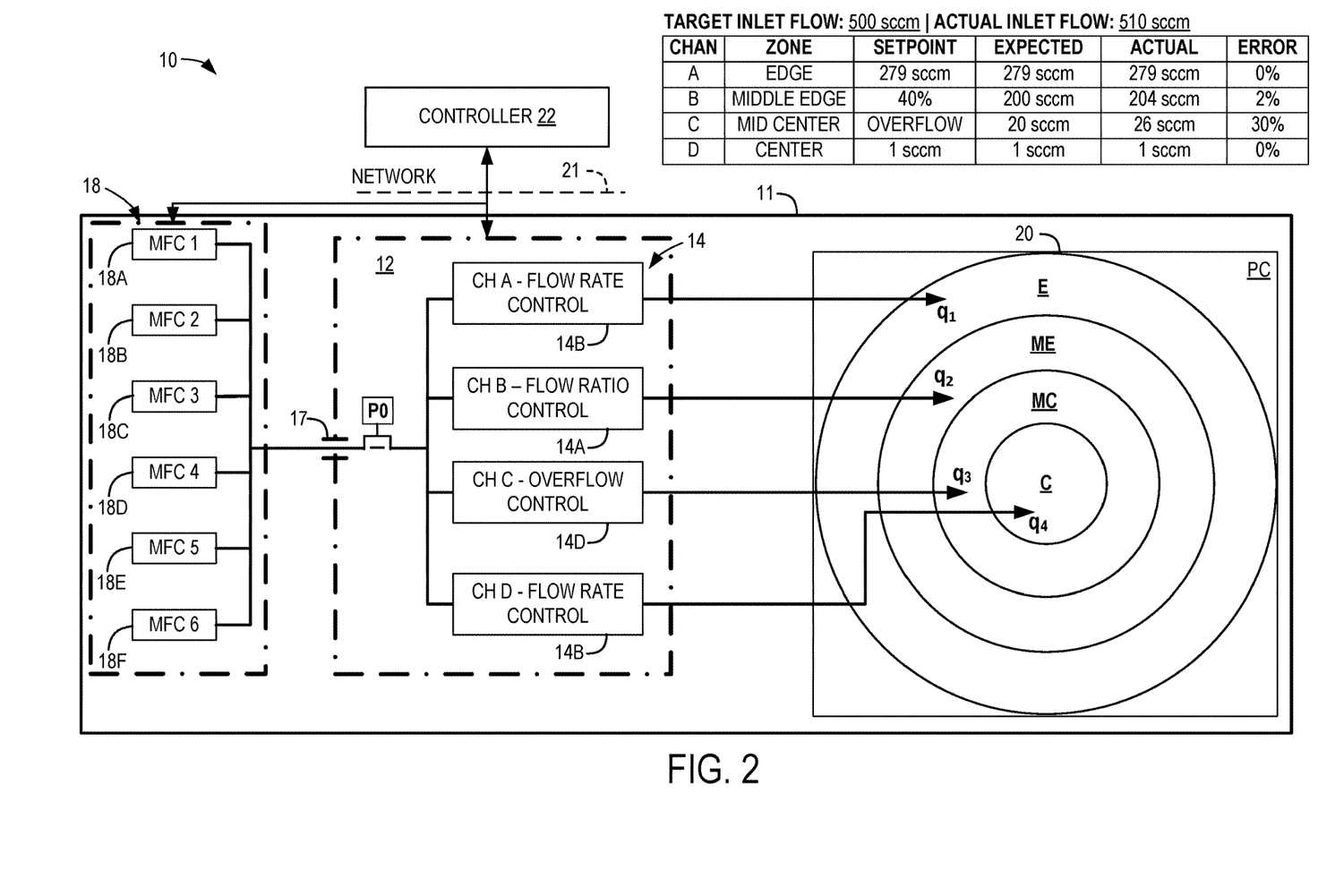
FIG. 2 is a schematic view of a second example configuration of the hybrid flow ratio controller system of FIG. 1.

FIGS. 2-6 illustrate different configurations of the hybrid flow ratio controller 10 of FIG. 1. Like parts in FIGS. 2-6 are numbered similarly to FIG. 1 and share their functions, and will not be redescribed except as below for the sake of brevity. FIG. 2 illustrates a configuration in which one flow ratio control channel 14A, two flow rate control channels 14B, and one overflow channel 14D are provided, labeled as Channels A-D. Channel A is configured as a flow rate control channel 14B, and is fluidically connected to edge zone E in showerhead 20. Channel B is configured as a flow ratio control channel 14A and is fluidically connected to middle edge zone ME in showerhead 20. Channel C is configured as an overflow channel 14D and is fluidically connected to middle center zone MC in showerhead 20. Channel D is configured as a flow rate control channel 14B and is fluidically connected to a center zone E in showerhead 20.

As illustrated in the table in FIG. 2, setpoints for each of the distribution channels 14 are 279 sccm for Channel A, 40% for Channel B, OVERFLOW for Channel C, and 1 sccm for Channel D. When a target inlet flow of 500 sccm is expected, the expected flows in each channel are 279, 200, 20, and 1 sccm respectively. Expected flow is computed based on the program logic in controller 22, which is controlling the flow of the upstream mass flow controllers 18. However, when the actual inlet flow is 510 sccm, the actual flows that occur in each channel controlled under the control modes described above, are 279, 204, 26 and 1 sccm respectively, resulting in 0% error in Channel A and D, 2% error in Channel B, and 20% error in Channel C. As can be seen, the error in the expected total inlet flow at inlet 17 is entirely or substantially entirely accommodated in the ratio flow control channel 14B and overflow control channel 14D. This has the technical benefit of reproducing substantially zero error in the low flow center channel C, potentially reducing defects due to under flow in high precision, low flow semiconductor manufacturing processes occurring in the center zone.

Figure 3:
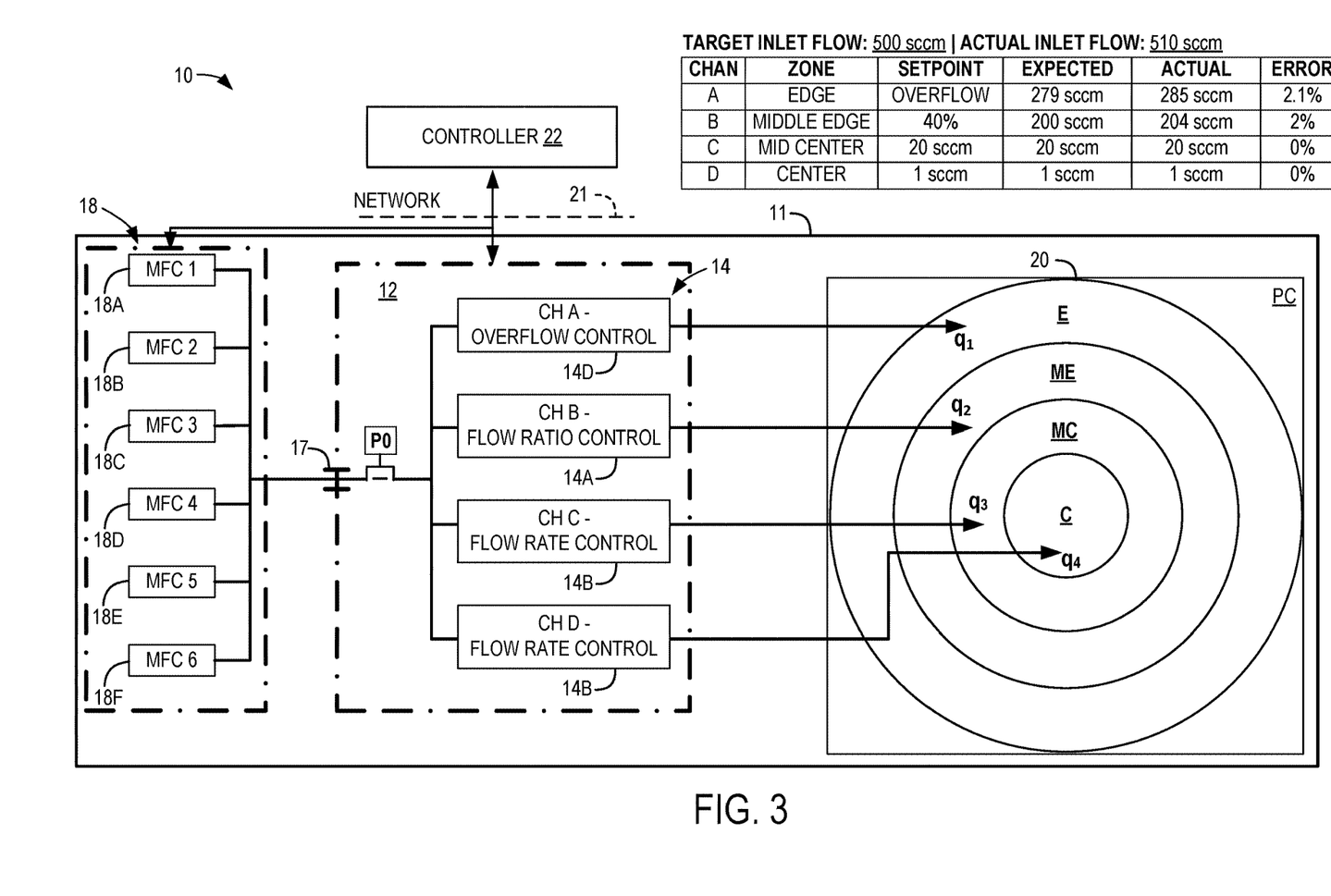
FIG. 3 is a schematic view of a third example configuration of the hybrid flow ratio controller system of FIG. 1.

FIG. 3 illustrates another configuration in which one flow ratio control channel 14A, two flow rate control channels 14B, and one overflow channel 14D are provided, labeled as Channels A-D. In this example, Channel A is configured as an overflow channel 14D, and is fluidically connected to edge zone E in showerhead 20. Channel B is configured as a flow ratio control channel 14A and is fluidically connected to middle edge zone ME in showerhead 20. Channel C is configured as a flow rate control channel 14B and is fluidically connected to middle center zone MC in showerhead 20. Channel D is configured as a flow rate control channel 14B and is fluidically connected to a center zone E in showerhead 20. The number of distribution channels 14 is not limited and additional distribution channels 14 may be provided.

As illustrated in the table in FIG. 3, setpoints for each of the channels 14 are OVERFLOW for Channel A, 40% for Channel B, 20 sccm for Channel C, and 1 sccm for Channel D. When a target inlet flow of 500 sccm is expected, the expected flows in each channel are 279, 200, 20, and 1 sccm respectively. However, when the actual inlet flow is 510 sccm, the actual flows that occur in each channel controlled under the control modes described above, are 285, 204, 20 and 1 sccm respectively, resulting in 2.1% error in Channel A, 2% error in Channel B, and substantially 0% error in Channels C and D. As can be seen, the error in the expected total inlet flow at inlet 17 is entirely or substantially entirely accommodated in the ratio flow control channel 14A and overflow control channel 14D, which are Channels A and B in this example. This has the technical benefit of reproducing substantially zero error in the low flow Channel D that supplies the center zone C and in the relatively low flow Channel C that supplies the middle center zone of the showerhead 20. This potentially reduces defects due to overflow in high precision, low flow semiconductor manufacturing processes occurring in the center zone and middle center zone. In addition, the overflow is routed to the edge zone and middle edge zone, where semiconductor manufacturing processes requiring less precise flows may be carried out.

Figure 4:
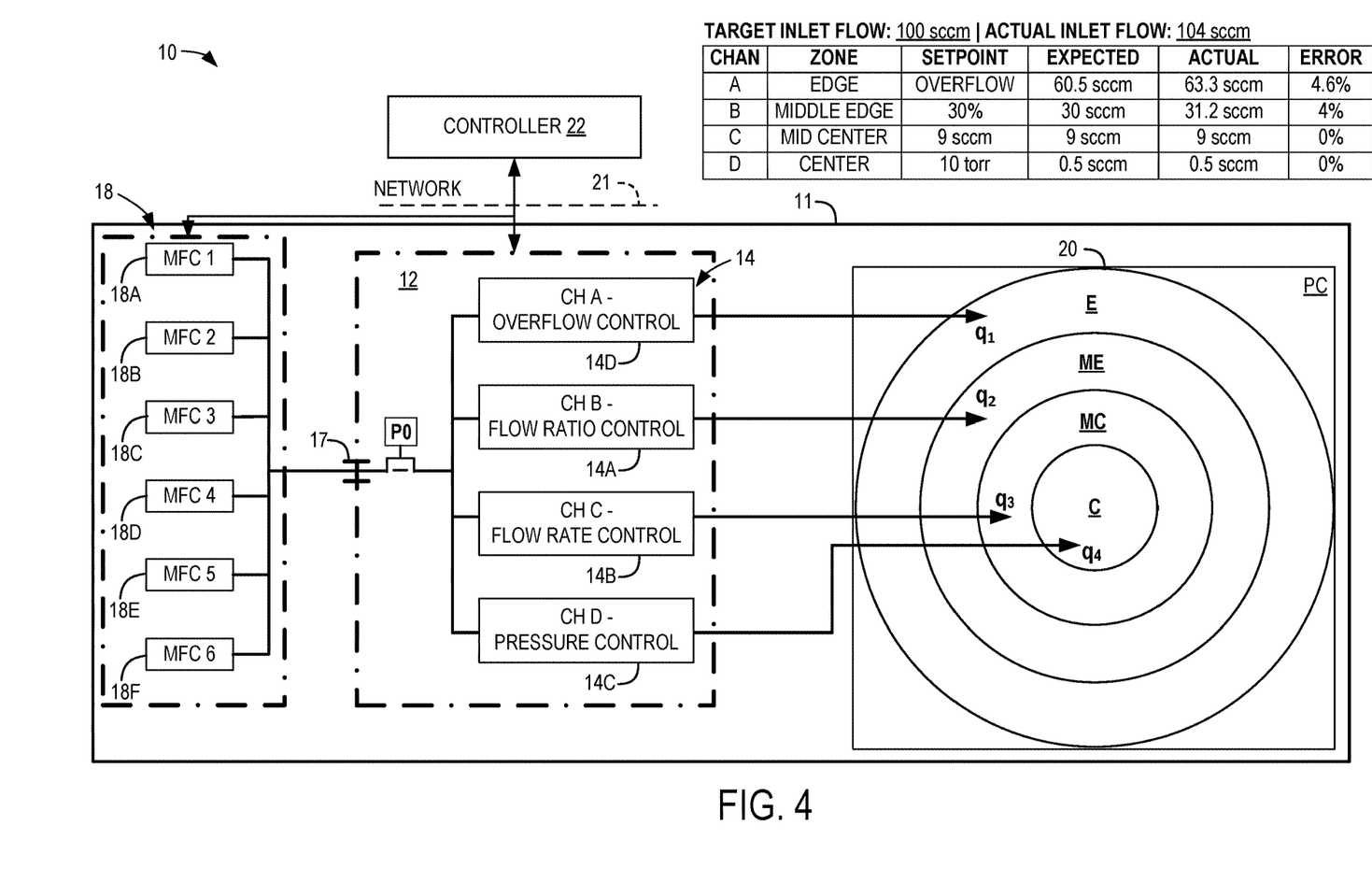
FIG. 4 is a schematic view of a fourth example configuration of the hybrid flow ratio controller system of FIG. 1.

FIG. 4 illustrates a configuration that is similar to the configuration of FIG. 3, except that Channel D is configured as a pressure control channel 14C. Like the above configurations, the number of distribution channels 14 illustrated in FIG. 4 is not limited and additional distribution channels 14 may be provided. As illustrated in the table in FIG. 4, setpoints for each of the distribution channels 14 are OVERFLOW for Channel A, 30% for Channel B, 9 sccm for Channel C, and 10 Torr for Channel D. When a target inlet flow of 100 sccm is expected, the expected flows in each channel are 60.5, 30, 9, and 0.5 sccm respectively. However, when the actual inlet flow is 104 sccm, the actual flows that occur in each channel controlled under the control modes described above, are 63.3, 31.2, 9 and 0.5 sccm respectively, resulting in 4.6% error in Channel A, 4% error in Channel B, and substantially 0% error in Channels C and D. As can be seen, the error in the expected total inlet flow at inlet 17 is entirely or substantially entirely accommodated in the ratio flow control channel 14A and overflow control channel 14D, which are again Channels A and B in this example. This has the technical benefit of reproducing substantially zero error in the pressure controlled low flow Channel D that supplies the center zone C and in the flow controlled, relatively low flow Channel C that supplies the middle center zone of the showerhead 20. This has similar technical benefits as described above for the previous configuration of reducing manufacturing defects for configurations in which processes carried out at the center and middle center zones of the showerhead are sensitive to small flow fluctuations.

Figure 5:
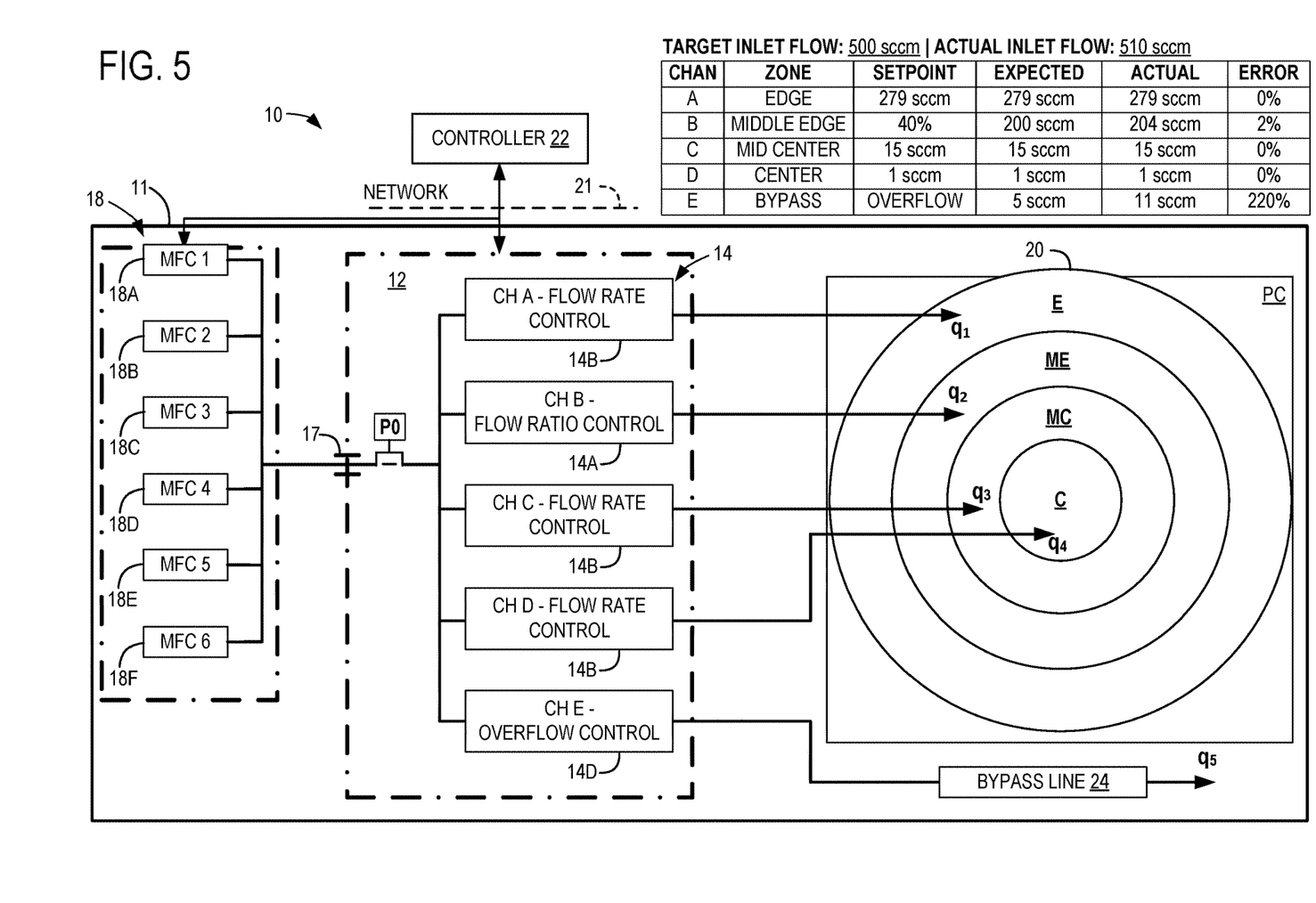
FIG. 5 is a schematic view of a fifth example configuration of the hybrid flow ratio controller system of FIG. 1.

FIG. 5 illustrates a configuration in which one flow ratio control channel 14A, three flow rate control channels 14B, and one overflow channel 14D are provided, labeled as Channels A-E. In this example, Channel A is configured as a flow rate control channel 14B, and is fluidically connected to edge zone E in showerhead 20. Channel B is configured as a flow ratio control channel 14A and is fluidically connected to middle edge zone ME in showerhead 20. Channels C and D are also configured as flow rate control channels 14B and are respectively fluidically connected to middle center zone MC and center zone C in showerhead 20. Channel E is configured as a bypass line 24 that bypasses the showerhead 20 and process chamber PC. Like the other configurations, the number of distribution channels 14 is not limited and additional distribution channels 14 may be provided.

As illustrated in the table in FIG. 5, setpoints for each of the channels 14 are 279 sccm for Channel A, 40% for Channel B, 15 sccm for Channel C, 1 sccm for Channel D, and OVERFLOW for Channel E. When a target inlet flow of 500 sccm is expected, the expected flows in each channel are 279, 200, 15, 1 sccm, and 5 sccm, respectively. However, when the actual inlet flow is 510 sccm, the actual flows that occur in each channel controlled under the control modes described above, are 279, 204, 15, 1 and 11 sccm respectively, resulting in 2% error in Channel B, a 220% error in Channel E, and substantially 0% error in Channels A, C, and D. As can be seen, the error in the expected total inlet flow at inlet 17 is entirely or substantially entirely accommodated in the ratio flow control channel 14A and overflow control channel 14D, which are Channels B and E in this example. Since Channel E is routed to the bypass line 24, the error for that channel is not introduced into the process chamber PC via the showerhead 20. Further, the error in the flow of Channel B is routed to the middle edge zone, which is relatively less sensitive to such error. Like the above configurations, this has the technical benefit of reproducing substantially zero error in the low flow Channel D that supplies the center zone C and in the relatively low flow Channel C that supplies the middle center zone of the showerhead 20, and in this example also exhibits substantially zero error in the flow rate to the edge zone from Channel A. This potentially reduces defects due to error in flows to zones that require high precision flows.

Figure 6:
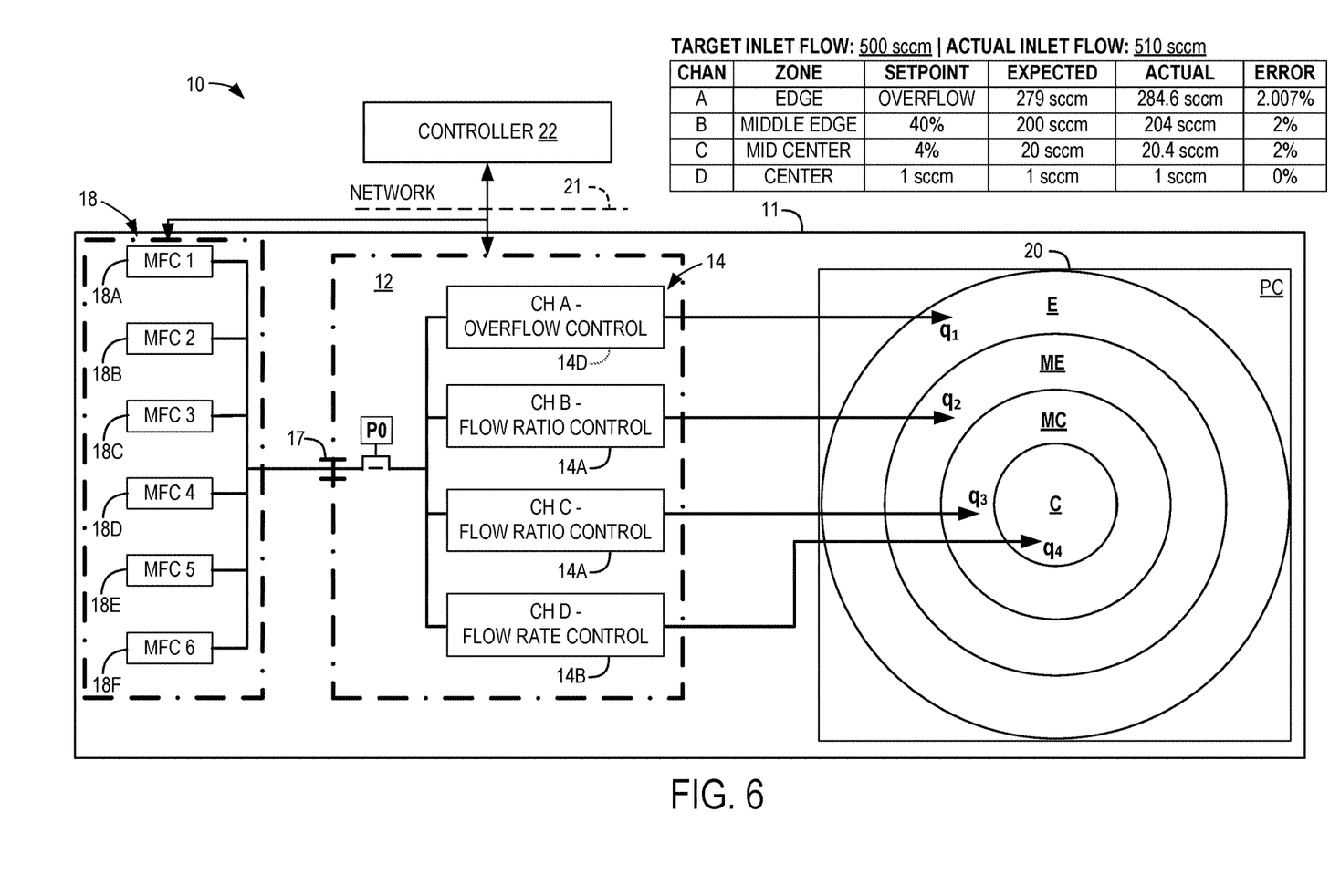
FIG. 6 is a schematic view of a sixth example configuration of the hybrid flow ratio controller system of FIG. 1.

FIG. 6 illustrates a configuration in which two flow ratio control channels 14A, one flow rate control channel 14B, and one overflow channel 14D are provided, labeled as Channels A-D. In this example, Channel A is configured as an overflow channel 14D, and is fluidically connected to edge zone E in showerhead 20. Channels B-C are configured as flow ratio control channels 14A and are respectively fluidically connected to middle edge zone ME and middle center zone MC in showerhead 20. Channel D is configured as a flow rate control channel 14B, and is fluidically connected to center zone C. Like the other configurations, the number of distribution channels 14 in this configuration is not limited and additional distribution channels 14 may be provided.

As illustrated in the table in FIG. 6, setpoints for each of the channels 14 are OVERFLOW for Channel A, 40% for Channel B, 4% for Channel C, 1 sccm for Channel D. When a target inlet flow of 500 sccm is expected, the expected flows in each channel are 279, 200, 20, and 1 sccm, respectively. However, when the actual inlet flow is 510 sccm, the actual flows that occur in each channel controlled under the control modes described above, are 284.6, 204, 20.4, and 1 sccm respectively, resulting 2.007% error in Channel A, 2% error in Channels B and C, and substantially 0% error in Channel D. As can be seen, the error in the expected total inlet flow at inlet 17 is entirely or substantially entirely accommodated in the flow ratio control channel 14A and overflow control channel 14D, which are Channels A-C in this example. Slightly more error is accommodated by the overflow channel 14D, which is Channel A in this example. The highly sensitive, low flow center zone is served with substantially zero error as a result, potentially reducing the chance of occurrence of manufacturing defects due to flow errors, similarly to the above configurations.

Although in the above configurations overflow is described as resulting in a positive flow error percentage in the overflow channel 14D and/or flow ratio control channel(s) 14A, it will be appreciated that the actual inlet flow at inlet 17 can be less than the target inlet flow. In such a case the actual overflow amount and actual flow in each flow ratio control channel will be less than expected, resulting in a negative flow error percentage.

Figure 7:
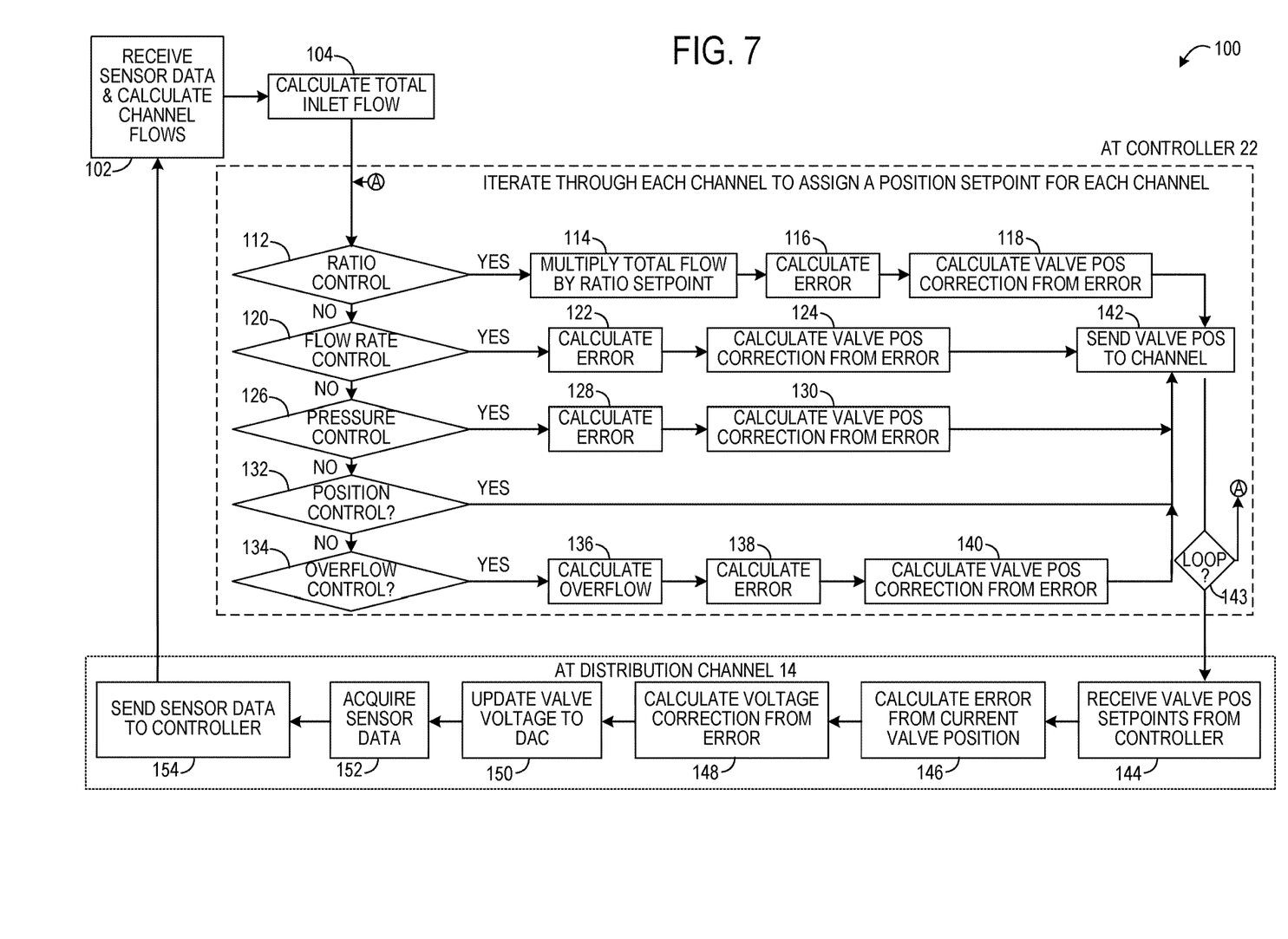
FIG. 7 shows a flowchart of a method for controlling fluid flow according to an example embodiment of the present disclosure.

Referring to FIG. 7, a method 100 of controlling fluid flow according to one example, is described with reference to the hybrid flow ratio controller system 10 of FIGS. 1 to 6. Method 100 may be implemented using the hardware and control configurations shown in FIGS. 1-6, or other suitable configurations. Steps 102-143 are typically implemented at controller 22, while steps 144-154 are typically implemented at each of the distribution channels 14. At step 102, sensor data is received and actual channel flows through the distribution channels of the distribution channel array are calculated based on the sensor data. The sensor data may be, for example, pressure signals from P0, P1, and P2, temperature signals from temperature sensor T, and valve position signals from valve position sensor Z from the distribution channels 14, as well as similar signals from upstream mass flow controllers 18. At step 104, the actual total inlet flow through the inlet is calculated. Steps 112 through step 142 are iterated through each distribution channel, by looping at 143 until each distribution channel has been assigned a valve position setpoint.

At step 112, it is determined whether the distribution channel is a flow ratio control channel 14A having a predetermined ratio setpoint. If so (YES at 112), then flow ratio control mode is executed, by executing steps 114 to 118. At step 114, the actual total inlet flow is multiplied by the predetermined ratio setpoint to yield a flow rate setpoint for the current distribution channel 14. At step 116, the error is calculated between the actual flow rate for that channel and the target flow rate indicated by the flow rate setpoint for that channel. At step 118, a valve position correction is calculated from the calculated flow rate error, and an updated valve position setpoint is determined based on the valve position correction. At step 142, the updated valve position setpoint is sent to the distribution channel, which in turn causes the valve position to change for that channel, as discussed below.

When the distribution channel is determined not to be a flow ratio control channel 14A (NO at 112), the method proceeds to step 120, where it is determined whether the distribution channel is a flow rate control channel 14B and has a predetermined flow rate setpoint. If so (YES at 120), then the flow rate control mode is executed by executing steps 122 to 142. At step 122, the error between the actual flow rate for the channel and the predetermined flow rate setpoint for the channel is calculated. At step 124, a valve position correction is calculated from the flow rate error for the channel, and an updated valve position setpoint is determined based on the calculated valve position correction. At step 142, the valve position setpoint is sent to the distribution channel, which in turn causes the valve position to change for that channel, as discussed below.

When the distribution channel is determined not to be a flow rate control channel 14B and not have a flow rate setpoint (NO at 120), the method proceeds to step 126, where it is determined whether the distribution channel 14 is a pressure control channel 14C that has a predetermined pressure setpoint. If so (YES at 126), then a pressure control mode is executed, by implementing the steps 128 and 130. The pressure control mode may for example be a first pressure control mode based on signals from an upstream pressure sensor P1 in a differential pressure sensor D for the channel or a second pressure control mode based on signals from a downstream pressure sensor P2 in a differential pressure sensor D for the channel, as described above. At step 128, the error between the actual pressure and the predetermined pressure setpoint for the current pressure control channel 14C is calculated. At step 130, a valve position correction is calculated from the pressure error, and a valve position setpoint is determined based on the valve position correction. At step 142, the valve position setpoint is sent to the distribution channel, which in turn causes the valve position to change for that channel, as discussed below.

When the distribution channel is determined not to be a pressure control channel 14C (NO at 126), at step 132, it is determined whether the distribution channel 14 is a position control channel with a predetermined valve position setpoint. If so (YES at 132), the method proceeds to 142, where the predetermined valve position is sent to the current distribution channel.

When it is determined that the distribution channel 14 is not a position control channel (NO at 132), at step 134, it is determined whether the distribution channel 14 is an overflow channel 14D. If so (YES at 132), the overflow mode is implemented by executing steps 136-140. At step 136, an overflow amount, i.e., an overflow flow rate, is calculated by calculating the difference between the actual inlet flow and the sum of the flow in the remainder of the plurality of distribution channels 14 excluding the overflow channel 14D. At step 138, the error between the calculated overflow flow rate and the current overflow flow rate from the prior control iteration is computed. At step 140, a valve position correction is calculated from the overflow flow rate error, and the valve position setpoint is determined based on the valve position correction. At step 142, the determined valve position setpoint is sent to the overflow channel 14D, which in turn causes the valve position to change for that channel.

At step 144, the valve position setpoint is received by each distribution channel 14 from the controller 22. At step 146, a valve position error is calculated between the current valve position sensed at the distribution channel 14 and the valve position setpoint received from the controller. At step 148, a voltage correction is calculated from the calculated valve positional error. At step 150, the valve voltage applied at distribution channel 14 is updated and sent to a digital to analog converter, which supplies the signal to the variable position valve 16 for the channel. This causes the valve position to change, and the valve to move to an updated position indicated by the valve position setpoint.

At step 152, sensor data is acquired from the temperature sensor T, valve position sensor Z, upstream pressure sensor P1 and downstream pressure sensor P2 of the differential pressure sensor D for the current valve. At step 154, this sensor data is sent by the distribution channel 14 to the controller 22. Steps 144-154 are repeated for each distribution channel 14. After step 154, the method 100 moves back to step 102 of receiving sensor data and calculating channel flows.

Figure 8:
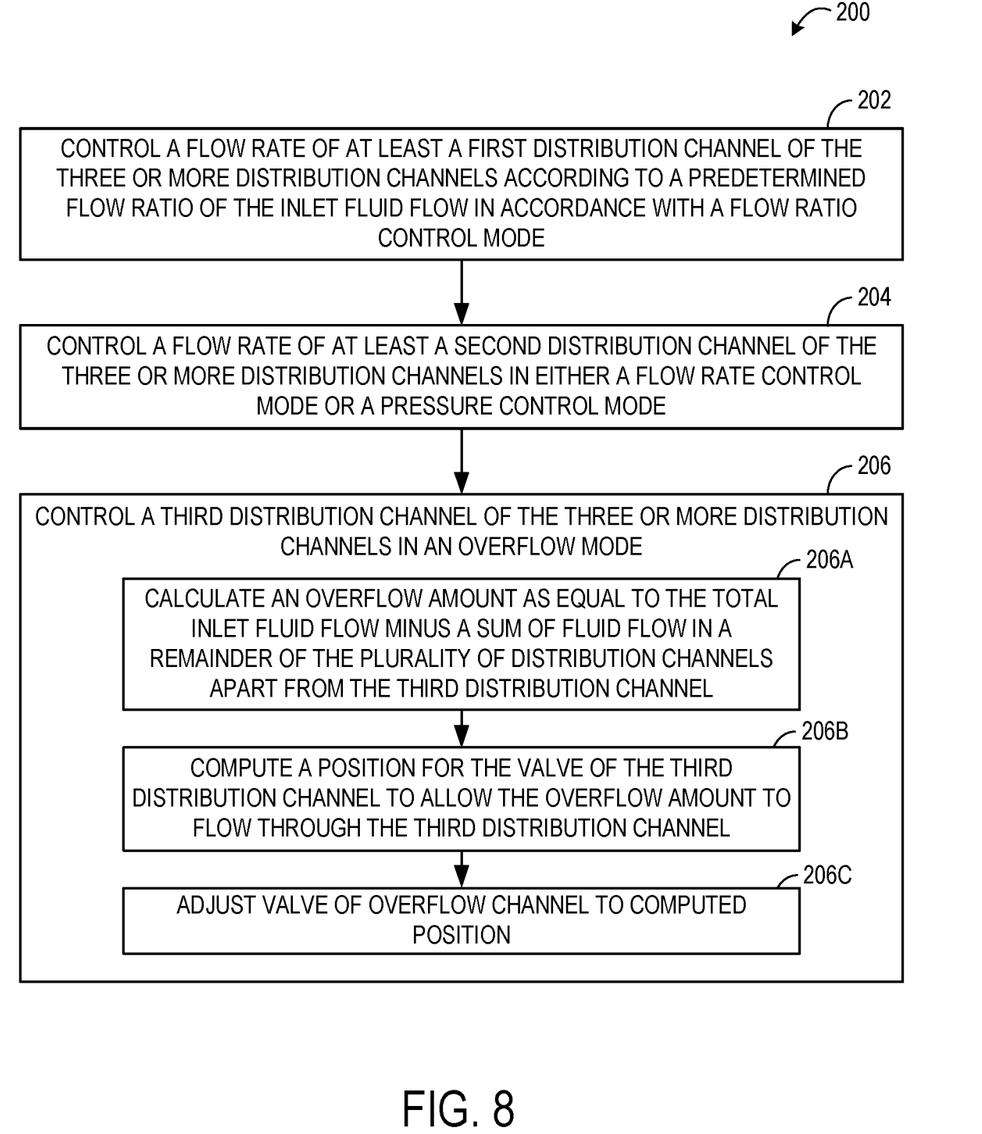
FIG. 8 shows a flowchart of a method for controlling fluid flow according to another example embodiment of the present disclosure.

As shown in FIG. 8, a flow distribution method 200 according to another example of the present disclosure is illustrated. Flow distribution method 200 is for use with a flow distribution system including an inlet configured to receive a total inlet fluid flow, and three or more distribution channels fluidically connected to the inlet and arranged in parallel in a branching flow path downstream of the inlet, each of the three or more distribution channels being provided with a respective variable flow control valve and configured to carry a respective portion of the total inlet fluid flow, a controller being operatively coupled to the respective variable flow control valves of each of the three or more distribution channels to control the respective variable flow control valves in a feedback loop. At 202, the method includes controlling a flow rate of at least a first distribution channel of the three or more distribution channels according to a predetermined flow ratio of the inlet fluid flow in accordance with a flow ratio control mode. At 204, the method includes controlling a flow rate of at least a second distribution channel of the three or more distribution channels in either a flow rate control mode or a pressure control mode. At 206, the method includes controlling a third distribution channel of the three or more distribution channels in an overflow mode. At 206A, the method further includes, in the overflow mode, calculating an overflow amount as equal to the total inlet fluid flow minus a sum of fluid flow in a remainder of the plurality of distribution channels apart from the third distribution channel, and at 206B, computing a position for the valve of the third distribution channel to allow the overflow amount to flow through the third distribution channel. At 206C, the method further includes adjusting a valve of the overflow channel to the computed position.

The method 200 may further include providing a showerhead downstream of the three or more distribution channels, the showerhead including a plurality of zones. The method may further include configuring the first distribution channel and second distribution channel to each fluidically connect to a respective outlet in a respective one of the plurality of zones. In one example, the method may further include configuring the third distribution channel to fluidically connect to a third outlet positioned in a zone designated to receive the overflow. In another example, the method may include configuring the third distribution channel to fluidically connect to a process chamber bypass line that bypasses the process chamber.

The method 200 may include implementing the flow rate control mode for a respective channel by calculating a flow rate for that channel based on the pressure sensor data for that channel and controlling a respective variable flow rate valve for that channel to cause the calculated flow rate to trend toward a target flow rate in that channel, and implementing the flow ratio control mode for a respective channel by receiving a target ratio of the inlet fluid flow for that channel and controlling a respective variable flow rate valve for that channel to cause an estimated ratio of the channel flow to the total inlet fluid flow to trend toward the target ratio.

The pressure control mode is either a first pressure control mode or a second pressure control mode, and the method may further include implementing the first pressure control mode for a respective channel by receiving a target pressure for that channel and controlling a respective variable flow rate valve for that channel to cause an actual pressure measured by an upstream pressure sensor of a differential pressure sensor of the channel to trend toward the target pressure, or implementing the second pressure control mode for a respective channel by receiving a target pressure for that channel and controlling a respective variable flow rate valve for that channel to cause an actual pressure measured by a downstream pressure sensor of a differential sensor of the channel to trend toward the target pressure.

In accordance with the present disclosure, outlet zones in a showerhead or downstream flow channel at which manufacturing processes that are sensitive to flow errors are conducted can be supplied with more repeatable and reproducible flows. On the other hand, other outlet zones, at which manufacturing processes that are more resilient to flow error, can be supplied with substantially all of the flow error due to upstream inlet flow variations. Accordingly, in high precision semiconductor applications, more precise and repeatable control can be exercised over low flow channel outputs (such as the middle center and center zone of a showerhead), and errors in flow can be diverted to zones that are less sensitive, reducing manufacturing defects.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein may define patentable subject matter apart from the disclosed examples and may find utility in other implementations not expressly disclosed herein.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

To the extent that terms "includes," "including," "has," "contains," and variants thereof are used herein, such terms are intended to be inclusive in a manner similar to the term "comprises" as an open transition word without precluding any additional or other elements.

The invention claimed is:

1. A hybrid flow ratio controller system, comprising:
an inlet configured to receive a total inlet fluid flow;
three or more distribution channels fluidically connected to the inlet and arranged in parallel in a branching flow path downstream of the inlet, each of the three or more distribution channels being provided with a respective variable flow control valve and being configured to carry a respective portion of the total inlet fluid flow; and
a controller operatively coupled to the respective variable flow control valves of each of the three or more distribution channels to control the respective variable flow control valves in a feedback loop, wherein
the controller is configured to control a flow rate of at least a first distribution channel of the three or more distribution channels according to a predetermined flow ratio of the inlet fluid flow in accordance with a flow ratio control mode,
the controller is configured to control a flow of at least a second distribution channel of the three or more distribution channels in either a flow rate control mode or a pressure control mode, and
the controller is configured to control a third distribution channel of the three or more distribution channels in an overflow mode.

2. The hybrid flow ratio controller system of claim 1, wherein, in the overflow mode, the controller is configured to:
calculate an overflow amount as equal to the total inlet fluid flow minus a sum of fluid flow in a remainder of the three or more distribution channels apart from the third distribution channel, and
compute a position for the valve of the third distribution channel to allow the overflow amount to flow through the third distribution channel.

3. The hybrid flow ratio controller system of claim 1, further comprising:
a flow splitter block within which the inlet and the three or more distribution channels is formed.

4. The hybrid flow ratio controller system of claim 1, further comprising a showerhead provided downstream of the three or more distribution channels.

5. The hybrid flow ratio controller system of claim 1, wherein
the showerhead includes a plurality of zones; and
the first distribution channel and second distribution channel are each fluidically connected to a respective outlet in a respective one of the plurality of zones.

6. The hybrid flow ratio controller system of claim 5, wherein
the third distribution channel is fluidically connected to a third outlet positioned in a zone designated to receive the overflow.

7. The hybrid flow ratio controller system of claim 5, wherein
the third distribution channel is fluidically connected to a process chamber bypass line that bypasses the process chamber.

8. The hybrid flow ratio controller system of claim 5, wherein
the first distribution channel is fluidically connected to a first outlet positioned in a middle edge zone of the showerhead;
the second distribution channel is fluidically connected to a second outlet positioned in a middle center or center zone of the showerhead; and
the third distribution channel is fluidically connected to a third outlet positioned in an edge zone of the showerhead.

9. The hybrid flow ratio controller system of claim 1, wherein each of the three or more distribution channels is provided with a differential pressure sensor including upstream and downstream pressure sensors positioned upstream and downstream of a flow restrictor, respectively, configured to send pressure sensor data to the controller.

10. The hybrid flow ratio controller system of claim 1, wherein
the controller is configured to implement the flow rate control mode for a respective channel by calculating a flow rate for that channel based on the pressure sensor data for that channel and controlling a respective variable flow rate valve for that channel to cause the calculated flow rate to trend toward a target flow rate in that channel; and
the controller is configured to implement the flow ratio control mode for a respective channel by receiving a target ratio of the inlet fluid flow for that channel and controlling a respective variable flow rate valve for that channel to cause an estimated ratio of the channel flow to the total inlet fluid flow to trend toward the target ratio.

11. The hybrid flow ratio controller system of claim 1, wherein
the pressure control mode is either a first pressure control mode or a second pressure control mode;
the controller is configured to implement the first pressure control mode for a respective channel by receiving a target pressure for that channel and controlling a respective variable flow rate valve for that channel to cause an actual pressure measured by an upstream pressure sensor of a differential pressure sensor of the channel to trend toward the target pressure; or
the controller is configured to implement the second pressure control mode for a respective channel by receiving a target pressure for that channel and controlling a respective variable flow rate valve for that channel to cause an actual pressure measured by a downstream pressure sensor of a differential pressure sensor of the channel to trend toward the target pressure.

12. The hybrid flow ratio controller system of claim 1, wherein
the second distribution channel is controlled in the flow rate control mode.

13. The hybrid flow ratio controller system of claim 1, wherein
the second distribution channel is controlled in the pressure control mode.

14. A flow distribution method, for use with a flow distribution system including an inlet configured to receive a total inlet fluid flow, and three or more distribution channels fluidically connected to the inlet and arranged in parallel in a branching flow path downstream of the inlet, each of the three or more distribution channels being provided with a respective variable flow control valve and configured to carry a respective portion of the total inlet fluid flow, a controller being operatively coupled to the respective variable flow control valves of each of the three or more distribution channels to control the respective variable flow control valves in a feedback loop, the method comprising:
controlling a flow rate of at least a first distribution channel of the three or more distribution channels according to a predetermined flow ratio of the inlet fluid flow in accordance with a flow ratio control mode;
controlling a flow rate of at least a second distribution channel of the three or more distribution channels in either a flow rate control mode or a pressure control mode; and
controlling a third distribution channel of the three or more distribution channels in an overflow mode.

15. The flow distribution method of claim 14, further comprising:
in the overflow mode:
calculating an overflow amount as equal to the total inlet fluid flow minus a sum of fluid flow in a remainder of the plurality of distribution channels apart from the third distribution channel, and
computing a position for the valve of the third distribution channel to allow the overflow amount to flow through the third distribution channel.

16. The flow distribution method of claim 14, wherein a showerhead is provided downstream of the three or more distribution channels, the showerhead including a plurality of zones, the method further comprising:
configuring the first distribution channel and second distribution channel to each fluidically connect to a respective outlet in a respective one of the plurality of zones.

17. The flow distribution method of claim 16, further comprising:
configuring the third distribution channel to fluidically connect to a third outlet positioned in a zone designated to receive the overflow.

18. The flow distribution method of claim 16, further comprising:
configuring the third distribution channel to fluidically connect to a process chamber bypass line that bypasses the process chamber.

19. The flow distribution method of claim 14, further comprising:
implementing the flow rate control mode for a respective channel by calculating a flow rate for that channel based on the pressure sensor data for that channel and controlling a respective variable flow rate valve for that channel to cause the calculated flow rate to trend toward a target flow rate in that channel; and
implementing the flow ratio control mode for a respective channel by receiving a target ratio of the inlet fluid flow for that channel and controlling a respective variable flow rate valve for that channel to cause an estimated ratio of the channel flow to the total inlet fluid flow to trend toward the target ratio.

20. The flow distribution method of claim 14, wherein the pressure control mode is either a first pressure control mode or a second pressure control mode, the method further comprising:
implementing the first pressure control mode for a respective channel by receiving a target pressure for that channel and controlling a respective variable flow rate valve for that channel to cause an actual pressure measured by an upstream pressure sensor of a differential pressure sensor of the channel to trend toward the target pressure; or
implementing the second pressure control mode for a respective channel by receiving a target pressure for that channel and controlling a respective variable flow rate valve for that channel to cause an actual pressure measured by a downstream pressure sensor of a differential pressure sensor of the channel to trend toward the target pressure.

* * * * *